(12) United States Patent
Döhler

(10) Patent No.: US 11,504,911 B2
(45) Date of Patent: Nov. 22, 2022

(54) IRRADIATION DEVICE FOR AN APPARATUS FOR ADDITIVELY MANUFACTURING THREE-DIMENSIONAL OBJECTS

(71) Applicant: CONCEPT LASER GMBH, Lichtenfels (DE)

(72) Inventor: Tim Döhler, Großheirath (DE)

(73) Assignee: CONCEPT LASER GMBH, Lichtenfels (DE)

( * ) Notice: Subject to any disclaimer, the term of this patent is extended or adjusted under 35 U.S.C. 154(b) by 841 days.

(21) Appl. No.: 16/293,611

(22) Filed: Mar. 5, 2019

(65) Prior Publication Data

US 2020/0156319 A1    May 21, 2020

(30) Foreign Application Priority Data

Nov. 21, 2018 (EP) ..................................... 18207633

(51) Int. Cl.
*B29C 64/35* (2017.01)
*B22F 10/20* (2021.01)
(Continued)

(52) U.S. Cl.
CPC .............. *B29C 64/35* (2017.08); *B22F 10/20* (2021.01); *B29C 64/153* (2017.08); *B29C 64/268* (2017.08); *B29C 64/393* (2017.08); *B22F 2201/11* (2013.01); *B29C 64/371* (2017.08); *B33Y 10/00* (2014.12); *B33Y 30/00* (2014.12); *B33Y 40/00* (2014.12); *B33Y 50/02* (2014.12)

(58) Field of Classification Search
CPC ..... B29C 64/35; B29C 64/268; B29C 64/393; B29C 64/371; B29C 64/25; B29C 64/264; B33Y 10/00; B33Y 30/00; B33Y 50/02; B22F 12/00; Y02P 10/25
USPC ......................................................... 700/117
See application file for complete search history.

(56) References Cited

U.S. PATENT DOCUMENTS

2016/0052056 A1   2/2016  Fager
2018/0010237 A1   1/2018  Forseth et al.
(Continued)

FOREIGN PATENT DOCUMENTS

DE     102014000415 A1    7/2015
WO     WO2016/026668 A1    2/2016

OTHER PUBLICATIONS

European Search Report Corresponding to EP18207633.1 dated May 8, 2019.

*Primary Examiner* — Michael J Brown
(74) *Attorney, Agent, or Firm* — Dority & Manning, P.A.

(57) ABSTRACT

Irradiation device (5) for an apparatus (1) for additively manufacturing three-dimensional objects (2) by means of successive layerwise selective irradiation and consolidation of layers of a build material (3) which can be consolidated by means of an energy source, which Irradiation device (5) comprises at least one irradiation unit (6-8), preferably an optical unit, arranged in a housing (9) of the Irradiation device (5), wherein a stream generating device (10) is provided that is adapted to guide a gas stream (11) that is adapted to be charged with residues present inside the housing (9) through the housing (9) of the Irradiation device (5) along a streaming path in which the gas stream (11) at least partially streams alongside or through the at least one irradiation unit (6-8) for removing residues from the housing (9).

20 Claims, 1 Drawing Sheet

(51) Int. Cl.
  *B29C 64/153* (2017.01)
  *B29C 64/393* (2017.01)
  *B29C 64/268* (2017.01)
  *B29C 64/264* (2017.01)
  *B29C 64/25* (2017.01)
  *B33Y 10/00* (2015.01)
  *B33Y 30/00* (2015.01)
  *B33Y 40/00* (2020.01)
  *B33Y 50/02* (2015.01)
  *B29C 64/371* (2017.01)

(56) References Cited

U.S. PATENT DOCUMENTS

| | | | |
|---|---|---|---|
| 2019/0022940 A1* | 1/2019 | Hofmann | B22F 10/20 |
| 2020/0061655 A1* | 2/2020 | Wakelam | B22F 12/00 |
| 2021/0170494 A1* | 6/2021 | Mamrak | B33Y 30/00 |

* cited by examiner

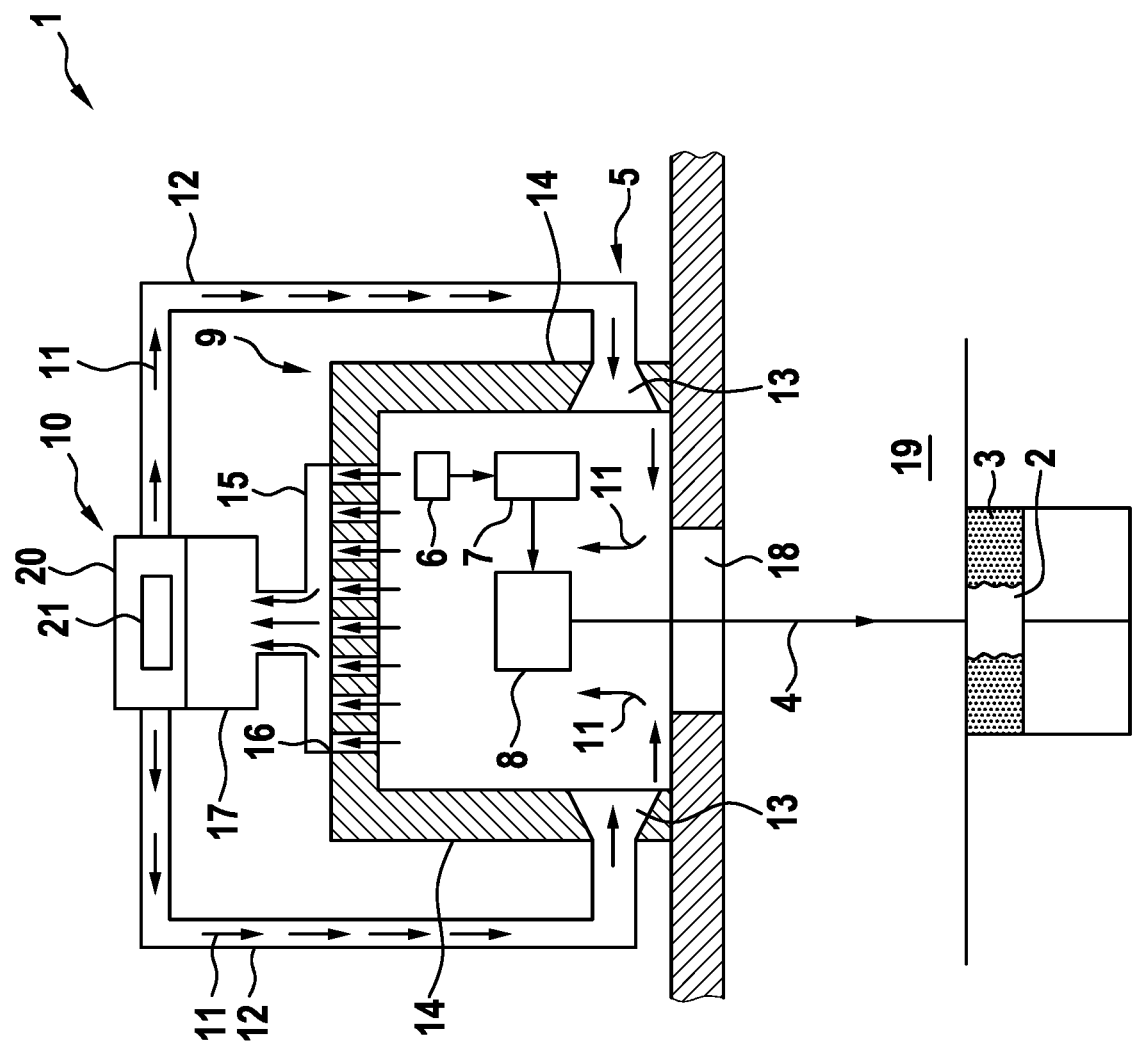

IRRADIATION DEVICE FOR AN APPARATUS FOR ADDITIVELY MANUFACTURING THREE-DIMENSIONAL OBJECTS

CROSS-REFERENCE TO RELATED APPLICATIONS

This application claims priority to European Patent Application serial no. 18 207 633.1 filed Nov. 21, 2018, the contents of which is incorporated herein by reference in its entirety as if set forth verbatim.

The invention relates to an irradiation device for an apparatus for additively manufacturing three-dimensional objects by means of successive layerwise selective irradiation and consolidation of layers of a build material which can be consolidated by means of an energy source, which irradiation device comprises at least one irradiation unit, preferably an optical unit, arranged in a housing of the irradiation device.

Apparatuses for additively manufacturing three-dimensional objects, e.g. via successive selective irradiation of layers of a build material, e.g. via an energy beam, are generally known from prior art. Such apparatuses comprise irradiation devices for providing an energy source, such as a laser source or an electron source, for consolidating the build material. Further, it is known from prior art that such irradiation devices comprise housings in which irradiation units, e.g. various optical and electronic components of the irradiation device, such as beam guiding units, in particular scanners, lenses and lens assemblies and the like, can be arranged.

The housing of the irradiation device further is used to protect the irradiation units arranged inside the housing, e.g. from the process environment in the process chamber of the apparatus, in particular involving high temperatures due to the melting process, soot, smoke and smolder, build material particles and the like. Additionally, the housing partially protects the irradiation units from residues contained in the ambient air, such as dust or other particles. Housings of irradiation devices known from prior art may further be manufactured nearly gas tight, but it is still necessary to regularly clean the irradiation units from the residues present in the ambient air inside the housing, e.g. dust deposited on (optical) surfaces of the irradiation units.

It is an object of the present invention to provide an improved irradiation device, preferably allowing for a reduction of a contamination of the irradiation units inside the housing, in particular reducing the effort for cleaning irradiation units inside the housing.

The object is inventively achieved by an irradiation device according to claim 1. Advantageous embodiments of the invention are subject to the dependent claims.

The irradiation device described herein is an irradiation device for an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance.

Alternatively, the successive layerwise selective consolidation of build material may be performed via at least one binding material. The binding material may be applied with a corresponding application unit and, for example, irradiated with a suitable energy source, e.g. a UV light source.

Such an apparatus may comprise a number of functional units which are used during its operation. Exemplary functional units are a process chamber, an inventive irradiation device, as described before, which may be adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the invention relates to an irradiation device for an additive manufacturing apparatus providing a housing in which at least one irradiation unit, for example an optical unit, is arranged. The invention is based on the idea that a stream generating device is provided, in particular a stream generating device that is coupled or can be coupled with the irradiation device, in particular the housing of the irradiation device. The stream generating device is adapted to guide a gas stream that is adapted to be charged with residues present inside the housing through the housing of the irradiation device along a streaming path in which the gas stream is at least partially streamed alongside or through the at least one irradiation unit for removing residues from the housing.

Therefore, the stream generating device may be used to generate a gas stream, preferably a stream of ambient air that can be sucked or blown into the housing of the irradiation device. The gas stream can be charged with residues that are present inside the housing, for example particulate residues, such as dust particles, that may otherwise adhere to surfaces of the irradiation unit, in particular surfaces of lenses, thereby, negatively influencing the process quality and the object quality of the object that is additively manufactured during the additive manufacturing process performed with the irradiation device. The stream generating device generates the gas stream in that the gas stream streams along a streaming path in which the gas stream at least partially streams alongside or through the at least one irradiation unit. Hence, the gas stream is streamed in that it is guided alongside or through the at least one irradiation unit for picking up and conveying residues present in that region around the irradiation unit and removing those residues from the irradiation unit. Preferably, the gas stream is guided through the housing and out of the housing in that residues that are picked up via the gas stream can efficiently be removed from the housing.

The housing further may be built gas tight in that the stream generating device may be used to generate an overpressure inside the housing. Thus, it can be avoided that residues, such as dust particles and the like can enter the housing from outside. The term "irradiation unit" in the scope of this application may refer to any arbitrary part of the irradiation device, in particular optical units, such as lenses or mirrors, beam splitters and the like, or other (opto-) electronic units, for instance. As the gas stream can be streamed alongside or through those components of the irradiation device it is possible to on the one hand pick up and convey free (floating) residues present inside the housing and further remove residues already adhered to surfaces of an irradiation unit and thereby actively remove residues from the irradiation unit. Thus, the process quality and object quality may be improved, as negative impacts caused by residues present in the housing can significantly be reduced. Further, downtimes of the irradiation device and therefore, downtimes of the entire apparatus the irradiation device is assigned to, can be avoided or reduced, as the need for cleaning of the housing of the irradiation device, in particular cleaning the irradiation unit(s), can significantly be reduced or even entirely avoided.

According to a preferred embodiment of the inventive irradiation device, the stream generating device may be adapted to adjust a position and/or an orientation, in particular a streaming direction, of at least one part of the streaming path dependent on the residue travel direction or a position and/or an orientation, in particular a streaming direction, of at least one part of the streaming path is defined dependent on a residue travel direction. Hence, it is possible that the stream generating device may adjust the gas stream, in particular a position of at least one part of the gas stream, e.g. a position that lies in the gas stream and that the gas stream is guided along or through on its way along the streaming path.

Further, an orientation of the streaming path or at least one part of the streaming path can be adjusted via the stream generating device, for example the streaming direction in which the gas stream is streamed through the housing of the irradiation device. The adjustment of the position and/or the orientation of the at least one part of the streaming path may be performed dependent on the residue travel direction. The residue travel direction in the scope of this application may refer to a most probable or determined direction in which the residues present inside the housing are most likely traveling. For example, due to gravity, residues may travel from the ceiling to the bottom of the housing thereby, adhering to a surface of the at least one irradiation unit. Thus, it is possible to take the residue travel direction into calculation and adjust the position and/or the orientation of the at least one part of the streaming path accordingly.

Of course, it is also possible to define the position and/or the orientation of the at least one part of the streaming path, in particular the entire streaming path, dependent on the residue travel direction. Hence, the stream generating device may initially be built in a predefined configuration that allows for guiding the gas stream along a defined streaming path which is defined dependent on the residue travel direction.

The inventive irradiation device may further be improved in that the streaming path may at least partially extend from a bottom region to a top region of the housing, in particular from a floor to a ceiling of the housing. Thus, as residues most likely travel from the ceiling to the floor of the housing due to gravity, the streaming path may preferably extend in the opposite direction, thereby picking up residues traveling along the residue travel direction and removing those residues from the housing.

The stream generating device of the inventive irradiation device may further comprise at least one stream inlet assigned to an inlet region and at least one stream outlet assigned to an outlet region of the housing. Thus, it is possible to suck or blow the gas stream into the housing via the at least one stream inlet which is arranged in an inlet region of the housing. The gas stream may be sucked from or blown out of the housing through the at least one stream outlet which is assigned to an outlet region of the housing. Hence, it is possible to define the streaming direction and/or or the streaming path dependent on the arrangement of the at least one stream inlet and the at least one stream outlet.

Further, the stream generating device of the inventive irradiation device may comprise at least two stream inlets and at least one stream outlet. By providing more than one stream inlet, it is possible to improve the distribution of the gas stream in the housing of the irradiation device. Thus, the gas stream may more homogeneously stream through the housing of the process chamber, wherein the positive effects of the gas stream on the irradiation unit, for example removing the residues from the housing and tempering the at least one irradiation unit can further be improved.

The at least two stream inlets may preferably be arranged in two different wall structures of the housing, wherein the at least two stream inlets are preferably arranged in opposite or facing wall structures, e.g. sidewalls of the housing of the irradiation device. Further it is possible that the at least one stream outlet is arranged in a ceiling structure of the housing for ensuring that, as described before, the gas stream may be streamed from a bottom region, in which the at least two stream inlets may be arranged, e.g. in a bottom half of the housing, to the ceiling of the housing. Preferably, at least one stream inlet or the at least one stream outlet may comprise or be built as a diffusor element, adapted to distribute the gas stream that streams from or into the stream inlet or a stream outlet over a defined streaming area, thereby preferably enlarging the streaming area for enabling a homogeneous flow of the gas stream through the housing.

According to another embodiment of the inventive irradiation device, the at least one stream inlet or stream outlet may comprise at least two stream vents, preferably a plurality of stream vents. By providing at least two stream vents in the at least one stream inlet or stream outlet it is further possible to enhance the distribution and therefore, the homogeneous flow of the gas stream through the housing. The at least two vents may preferably be arranged as a vent array, in particular comprising a plurality of stream vents. Thus, for example a wall structure or the ceiling of the irradiation device may comprise a vent array or the vent array may be arranged in the ceiling or at least one wall structure of the housing of the irradiation device. Therefore, it is possible to more uniformly blow or suck the gas stream into the housing or through/out of the housing, respectively. Thus, it is assured that the streaming properties of the gas stream are more uniform in different areas inside the housing of the irradiation device, e.g. the streaming velocity or the flow rate of the gas stream is essentially uniform throughout the housing.

The stream generating device of the inventive irradiation device may further comprise at least one separating device that is adapted to separate, in particular filter, residues from the gas stream. Thus, it is possible that the gas stream can be filtered, wherein residues the gas stream is charged with, can be separated from the gas stream. Hence, it is ensured that residues that are transported out of the housing via the gas stream can be separated from the gas stream, e.g. before the gas stream is recycled into the housing. It is also possible that the at least one separating device is arranged on an inlet side or an inlet region of the stream generating device, e.g. in advance to the at least one stream inlet with respect to the streaming direction of the gas stream. Thus, it is assured that the gas stream that is fed into the housing is free of residues, as the residues can be separated from the gas stream before it is fed into the housing. Of course, both alternatives of arranging a separating device can be arbitrarily combined.

The separating device may, inter alia, comprise at least one separating unit that comprises at least one cyclone separator and/or a filter unit that comprises a filter element. The filter element may, for example, be built as or include at least one of an EPA and/or HEPA and/or ULPA element for removing residues, such as dust particles and the like, from the gas stream.

The separating device may, according to another embodiment of the inventive irradiation device, comprise an open gas circuit, preferably with the separating unit arranged in advance to the gas inlet, or a closed gas circuit. Hence, according to this embodiment, it is possible to suck or blow the gas stream into the housing and suck or blow the gas stream out of the housing into the environment. For example, it is possible that the gas stream may be streamed from the environment through the at least one separating unit into the housing and removed from the housing through the at least one gas outlet. Therefore, it is assured that the gas stream that is brought from the environment of the housing into the housing of the irradiation device, is free of residues, such as dust particles, as the separating unit that is arranged in advance to the gas inlet, may separate, in particular filter, the residues present in the gas stream in that the gas stream that is fed into the housing is essentially free of residues.

It is also possible to have the stream generating device comprise a closed gas circuit. The term "gas circuit" may refer to any circuit through which the gas can be streamed, e.g. involving a pipe structure or a channel structure adapted to guide the gas stream. The closed gas stream my preferably involve a pipe structure or a general structure that connects of the at least one stream outlet with the at least one stream inlet in that the gas stream that exits the housing through the at least one stream outlet is fed back to the at least one stream inlet, wherein the gas stream passes the at least one separating device in that the residues the gas stream is charged with can be removed from the gas stream and thereby, removed from the housing. Hence, it is ensured that the gas stream that is fed back into the housing is free of residues.

The irradiation unit may be or may comprise at least one scanner unit, preferably an x- and y-scanner, e.g. involving at least one movable mirror element that can be used to scan the energy beam across the build plane. It is further possible that the irradiation unit is or comprises at least one optical unit, in particular a lens or a lens assembly. Thus, the term "irradiation unit" may refer to any arbitrary component of the irradiation device that is arranged inside the housing. Therefore, it is possible to use the gas stream for removing residues from the irradiation unit, e.g. a movable mirror or a lens or a lens assembly, in that the quality of the additive manufacturing process, in particular the quality of the object that is manufactured during the additive manufacturing process, can meet defined requirements throughout the entire additive manufacturing process. Hence, integration of the process quality and/or optical quality due to residues adhering to an irradiation unit can be avoided or significantly reduced.

The inventive irradiation device may further be improved in that the stream generating device comprises a tempering unit adapted to temper, in particular to cool, the gas stream to a defined target temperature. Thus, the gas stream can be used to cool the irradiation unit of the irradiation device, e.g. assuring that the irradiation unit of the irradiation device remains on a stable target temperature. Thus, negative effects, such as thermal elongation of components of the irradiation device, e.g. lenses or optical mirror elements, can be avoided or at least significantly reduced. Therefore, the process quality and the object quality can be enhanced, as negative thermal effects can be avoided or at least reduced.

The stream generating device may preferably be adapted to control at least one property of the gas stream, preferably a flow rate and/or a streaming velocity and/or a temperature of the gas stream, dependent on at least one tempering parameter, preferably the temperature of the gas stream and/or the temperature of the at least one irradiation unit. Hence, a temperature of the irradiation unit and/or the temperature of the gas stream can be determined and the stream generating device, e.g. a tempering unit, can be used to control the gas stream dependent on the determined parameters. For example, it is possible to change the flow rate and/or the streaming velocity and/or the temperature of the gas stream dependent on the determined parameter. If at least one irradiation unit, e.g. an optical component of the irradiation device, is heating up above a defined threshold temperature, the gas stream can be streamed faster or the flow rate of the gas stream can be increased to dissipate heat from the irradiation unit. It is also possible to change the temperature of the gas stream that is streamed through the housing of the irradiation device to further transport heat away from the irradiation unit, for instance.

Besides, the invention relates to an apparatus for additively manufacturing three-dimensional objects by means of successive layerwise selective irradiation and consolidation of layers of a build material which can be consolidated by means of an energy source, wherein an irradiation device is provided that comprises at least one irradiation unit, preferably an optical unit, arranged in a housing of the irradiation device, wherein the irradiation device comprises a stream generating device that is adapted to guide a gas stream that is adapted to be charged with residues present inside the housing through the housing of the irradiation device along a streaming path in which the gas stream at least partially streams alongside or through the at least one irradiation unit for removing residues from the housing.

Further, the invention relates to a method for operating an apparatus for additively manufacturing three-dimensional objects by means of successive layerwise selective irradiation and consolidation of layers of a build material which can be consolidated by means of an energy source, which apparatus comprises an irradiation device that comprises at least one irradiation unit, preferably an optical unit, arranged in a housing of the irradiation device, wherein a gas stream is guided through the housing of the irradiation device along a streaming path along which the gas stream at least partially streams alongside or through the at least one irradiation unit, wherein the generated gas stream is charged with residues present inside the housing for removing the residues.

Exemplary embodiments of the invention are described with reference to the Fig. The sole Fig. is a schematic diagram showing an inventive apparatus with an inventive irradiation device.

The Fig. shows an apparatus 1 for additively manufacturing three-dimensional objects 2 by means of successive layerwise selective irradiation and consolidation of layers of a build material 3 via an energy source, e.g. by means of an energy beam 4. For generating the energy beam 4, the apparatus 1 comprises an irradiation device 5 comprising three irradiation units 6, 7, 8 arranged in a housing 9 of the irradiation device 5. In this exemplary embodiment the irradiation unit 6 is a laser source that is adapted to generate the energy beam 4, the irradiation unit 7 is a lens assembly through which the energy beam 4 is guided and the irradiation unit 8 is exemplary for a beam guiding unit, e.g. a scanner unit.

The irradiation device 5 further comprises a stream generating unit 10 that is adapted to generate a gas stream 11 that streams through a pipe structure 12 to two stream inlets 13 that are arranged in opposite wall structures 14 of the housing 9. As can further be derived from the Fig., The gas stream 11 streams through the inside of the housing 9 and thereby, streams alongside the irradiation units 6-8 to a stream outlet 15. The stream outlet 15 comprises a plurality of stream vents 16 through which the gas stream 11 can exit the housing 9.

The stream generating device 10 further comprises a separating device 17 which is adapted to separate residues present in the housing 9 from the gas stream 11.

The separating device 17 for example comprises a filter unit with a filter element, e.g. a HEPA filter element, that is adapted to filter particulate residues from the gas stream 11. The separating device 17 may further comprise a cyclone separator to further enhance the removal of residues the gas stream 11 is charged with.

In other words, it is possible that the gas stream 11 is guided into the housing 9 of the irradiation device 5 and thereby, can be charged with residues, such as dust particles. The residues the gas stream 11 is charged with may be removed from the housing 9 to ensure that the residues cannot adhere to surfaces of the irradiation units 6, 7 and 8. It is further possible that the gas stream 11 can be used to remove already adhered residues from the irradiation units 6-8 or other components of the housing 9. For example, it is possible to guide the gas stream 11 along a defined streaming path, wherein at least one part of the gas stream 11 is guided alongside a process window 18 that allows for guiding the energy beam 4 into a process chamber 19 of the apparatus, e.g. the chamber in which the additive manufacturing process is performed to build the three-dimensional object 2. Hence, the process window 18 can also be deemed an irradiation unit in the scope of this application.

The stream generating device 10 comprises a stream generating unit 20, e.g. a pump adapted to generate the gas stream 11. Further, the stream generating device 10 may involve a tempering unit 21 that is adapted to temper the gas stream 11, in particular cool the gas stream 11 to a defined target temperature. Thus, it is possible that the gas stream 11 is tempered to the defined target temperature, wherein the irradiation units 6-8 may also be tempered, in particular cooled, via the gas stream 11. The stream generating device 10 can adjust various parameters of the gas stream 11, in particular the streaming velocity and/or the flow rate and/or the temperature of the gas stream 11, preferably dependent on a determined parameter inside the housing 9, for example the actual temperature of the gas stream 11 or the temperature of at least one of the irradiation unit 6-8, for instance.

Of course, the apparatus 1 is adapted to perform the inventive method.

The invention claimed is:

1. An irradiation device for additively manufacturing three-dimensional objects by successive layerwise selective irradiation and consolidation of layers of a build material, the irradiation device comprising:
   at least one irradiation unit disposed in a housing of the irradiation device; and
   a stream generating device configured to guide a gas stream to be charged with residues present inside the housing through the housing along a streaming path, wherein the streaming path at least partially streams alongside or through the at least one irradiation unit for removing residues from the housing.

2. The irradiation device of claim 1, wherein the stream generating device comprises at least one stream inlet assigned to an inlet region and at least one stream outlet assigned to an outlet region of the housing.

3. The irradiation device of claim 2, wherein the at least one stream inlet or outlet comprises at least two stream vents.

4. The irradiation device of claim 3, wherein the at least two stream vents are arranged as a vent array.

5. The irradiation device of claim 4, wherein the stream generating device comprises an open gas circuit.

6. The irradiation device of claim 1, wherein the streaming path at least partially extends from a bottom region to a top region of the housing.

7. The irradiation device of claim 1, wherein the stream generating device comprises at least two stream inlets and at least one stream outlet.

8. The irradiation device of claim 1, wherein the stream generating device comprises at least one separating device that is adapted to separate residues from the gas stream.

9. The irradiation device of claim 1, wherein the stream generating device comprises a tempering unit adapted to temper the gas stream to a defined target temperature.

10. A method for additively manufacturing three-dimensional objects by successive layerwise selective irradiation and consolidation of layers of a build material, the method comprising:
    irradiating the build material using at least one irradiation unit disposed in a housing of an irradiation device; and
    streaming a gas stream from a stream generating device such that the gas stream is charged with residues present inside the housing, wherein the stream generating device guides the gas stream through the housing along a streaming path, wherein the streaming path at least partially streams alongside or through the at least one irradiation unit for removing residues from the housing.

11. The method of claim 10, where the stream generating device adjusts a position and/or an orientation of at least one part of the streaming path dependent on a residue travel direction, position, and/or an orientation.

12. The method of claim 10, wherein the streaming path at least partially extends from a bottom region to a top region of the housing.

13. The method of claim 10, wherein the stream generating device comprises at least two stream inlets and at least one stream outlet.

14. The method of claim 10, wherein the stream generating device comprises at least one stream inlet assigned to an inlet region and at least one stream outlet assigned to an outlet region of the housing.

15. The method of claim 14, wherein the at least two stream inlets are arranged in two different wall structures of the housing and/or the at least one stream outlet is arranged in a ceiling structure of the housing.

16. The method of claim 14, wherein the at least one stream inlet or outlet comprises at least two stream vents.

17. The method of claim 16, wherein the at least two stream vents are arranged as a vent array.

18. The method of claim 17, wherein the stream generating device comprises an open gas circuit.

19. The method of claim 10, wherein the stream generating device comprises a tempering unit adapted to temper the gas stream to a defined target temperature.

20. The method of claim 19, further comprising controlling, via the stream generating device, at least one property of the gas stream dependent on at least one tempering parameter of the gas stream and/or the at least one irradiation unit.

\* \* \* \* \*